United States Patent [19]

Kuhr

[11] Patent Number: 6,037,038
[45] Date of Patent: Mar. 14, 2000

[54] VEHICLE INTERIOR TRIM MEMBER HAVING INTEGRALLY MOLDED HOLLOW ASSIST HANDLE

[75] Inventor: Jerome J. Kuhr, Ida, Mich.

[73] Assignee: Textron Automotive Company Inc., Troy, Mich.

[21] Appl. No.: 09/050,698

[22] Filed: Mar. 30, 1998

[51] Int. Cl.[7] .................. B32B 3/20; B60J 5/00; D01D 5/24
[52] U.S. Cl. .................. 428/188; 428/192; 264/241; 264/328.1; 296/146.6
[58] Field of Search .................. 428/174, 188, 428/137, 192, 68, 178; 264/209.1, 241, 251, 328.1, 512, 531, 563, 572; 296/146.6

[56] References Cited

U.S. PATENT DOCUMENTS

| | | |
|---|---|---|
| 4,824,732 | 4/1989 | Hendry et al. . |
| 4,830,812 | 5/1989 | Kauer . |
| 5,037,687 | 8/1991 | Kargarzadeh et al. . |
| 5,064,714 | 11/1991 | Yamaguchi et al. .................. 428/171 |
| 5,118,455 | 6/1992 | Loren . |
| 5,225,141 | 7/1993 | Hendry . |
| 5,262,105 | 11/1993 | Komiyama et al. . |
| 5,306,540 | 4/1994 | Hayashi et al. .................. 428/172 |
| 5,395,582 | 3/1995 | Shigeno et al. . |
| 5,417,916 | 5/1995 | Ladney . |
| 5,501,120 | 3/1996 | Kikuchi et al. . |

*Primary Examiner*—Donald Loney
*Attorney, Agent, or Firm*—Reising, Ethington, Barnes, Kisselle, Learman & McCulloch, P.C.

[57] ABSTRACT

A vehicle interior trim member comprises trim panel configured to mount on a vehicle interior frame structure. The two ends of a hollow U-shaped handle integrally extend from an outer surface of the trim panel. A tubular interior cavity is disposed within and extends along the length of the handle. Cavity end walls are disposed across respective cavity ends adjacent the handle ends to Strengthen the handle. The handle and trim panel are integrally formed together as a single piece unitary member in a single operation from a single molten material. The cavity end walls may be configured to close off and seal the cavity. A panel aperture may be disposed in the trim panel between the handle ends and a panel plug disposed across the panel aperture, connected to a back surface of the panel by well known means. The cavity is formed in the handle by injecting a fluid such as nitrogen through gas injection nozzles into the molten handle material.

11 Claims, 2 Drawing Sheets

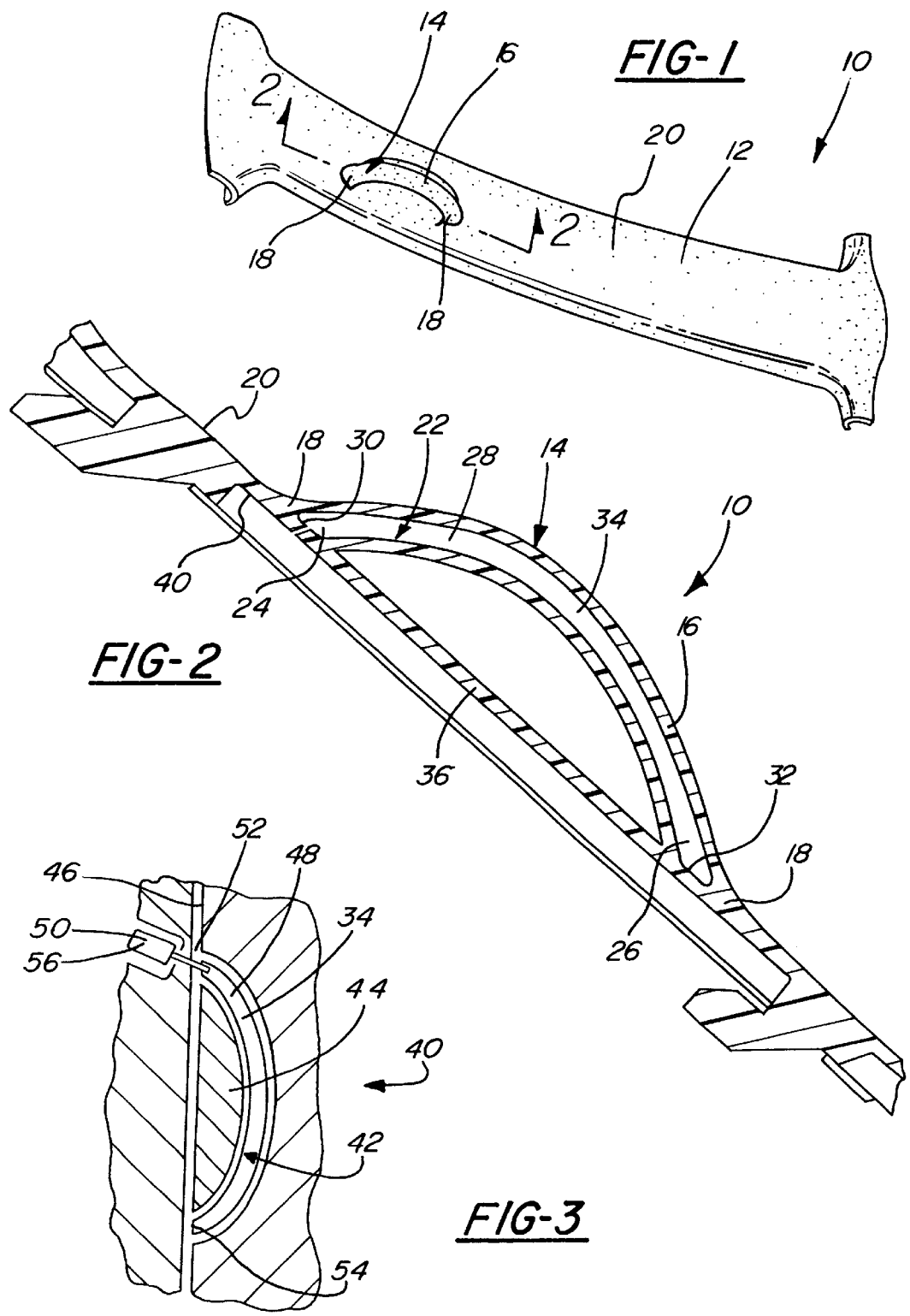

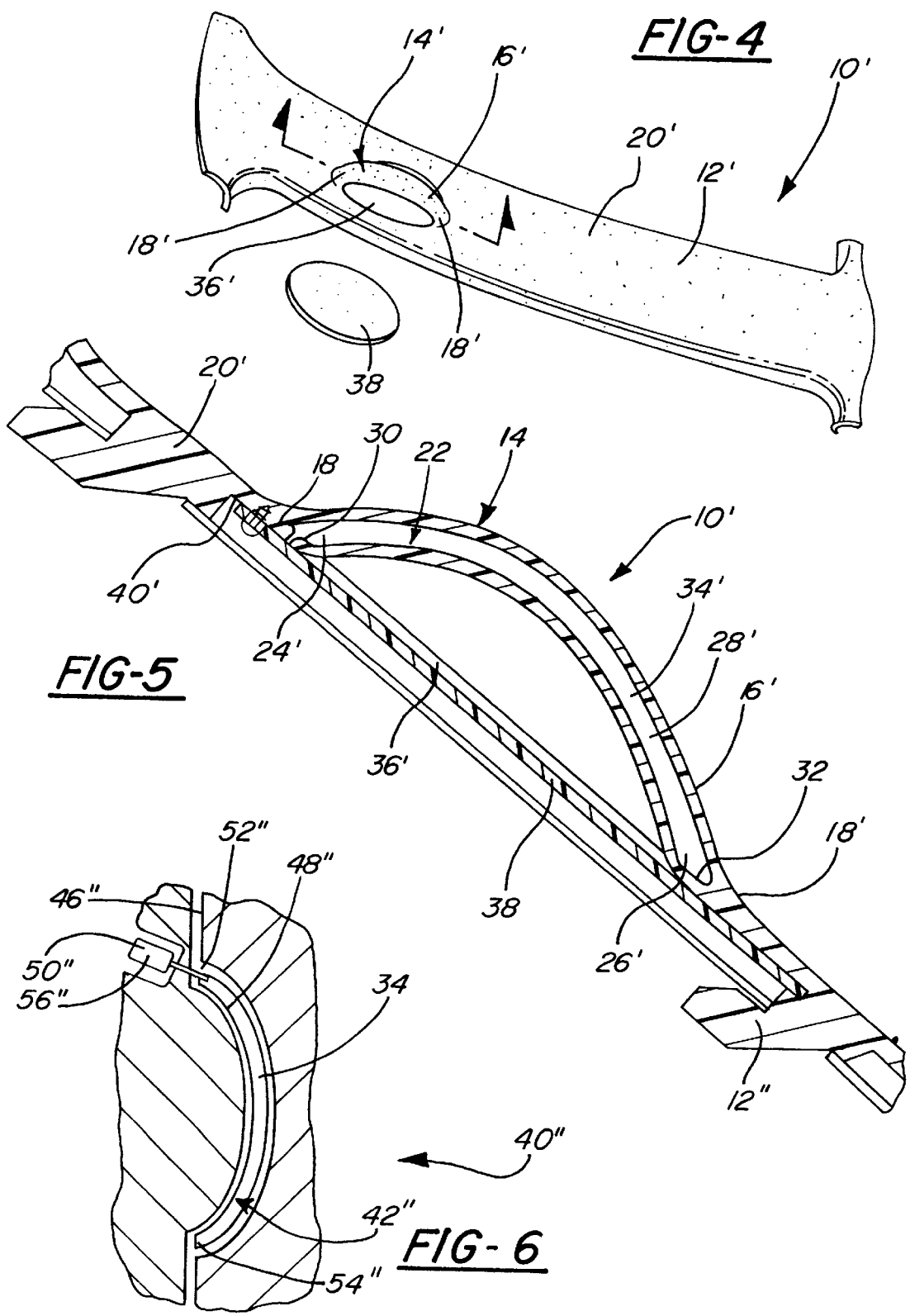

VEHICLE INTERIOR TRIM MEMBER HAVING INTEGRALLY MOLDED HOLLOW ASSIST HANDLE

TECHNICAL FIELD

This invention relates generally to automotive trim components for vehicle applications and more particularly to the construction and method of making assist handles for such trim members.

INVENTION BACKGROUND

The interior trim components of automotive vehicles are sometimes fitted with pull handles to assist an occupant in ingressing and egressing the vehicle. Such handles are typically located on an interior trim component near the door opening, such as on one or morel of the vertical pillars or the overhead trim pieces that span the pillars.

The typical approach to manufacturing such trim pieces has been to mold the handles separately from the trim component and then to join them together in a subsequent assembly operation. Such a multi-step molding and assembly approach contributes to the cost and complexity of making such trim components.

For example, U.S. Pat. No. 5,395,582 issued Mar. 7, 1995 to Shigeno et al. discloses a hollow bent portion such as an assist grip being formed by first injecting resin material into a mold then injecting a fluid, such as a gas, into the resin material to form a cavity within the part. U.S. Pat. No. 5,262,105 issued Nov. 16, 1993 to Komiyama et al. discloses a similar process. According to each of these methods, after curing, the assist grip must be poslt-applied to a support structure such as a trim panel. Therefore, attachment portions of the assist grip must be formed to include structures such as bosses or interlocking mechanical members configured to support fasteners or to otherwise accommodate attachment of the assist grip to a support structure.

It is also known to integrally form the soft outer skin of a door handle on an integral armrest portion of an interior door panel. U.S. Pat. No. 5,037,687 issued Aug. 6, 1991 to Kargarzadeh et al. and assigned to the assignee of the present invention, discloses such a process and product. According to Kargarzadeh, a soft handle skin is integrally formed with a soft door panel armrest skin by using a special tubular mold tool and a shell tool. The tubular tool is supported in an elongated opening in a concave trench portion of the shell tool. An interior surface of the tubular tool is shaped to complement the exterior surface contours of the handle. The concave trench portion of the mold surface of the shell tool is shaped to complement the exterior surface contours of the armrest portion of the door panel skin. The surfaces are heated and powdered thermoplastic material is cast against the shell tool and into the interior of the tubular tool. The material fuses against these surfaces to form a skin or shell in the shape of a door panel having an armrest and integral door handle. The tubular mold tool is then disassembled and removed leaving a hollow channel, open at each of two opposite ends, that extends through the newly formed handle skin. The open ends in the handle skin are necessary to allow a separate structural member to be inserted through the hollow channel and attached at its ends to the surrounding trim panel structure. A flexible foam is then injected through the handle channel which encapsulates the structural member and supports the desired skin shape upon curing.

What is needed is an interior trim panel having an integrally formed hollow handle that is stronger and better able to support the weight of an ingressing or egressing passenger. What is also needed is a method of integrally forming a hollow handle with an interior trim panel that requires fewer steps.

INVENTION SUMMARY

In accordance with this invention, a vehicle interior trim member includes a hollow handle integrally formed on a trim panel and having an inner cavity closed at each of two opposite ends by cavity end walls. The trim panel is configured to mount on a vehicle interior frame structure. The hollow handle has an elongated main handle body extending between two opposite handle ends. The handle ends integrally extend from an outer surface of the trim panel The cavity extends along and within the main body portion between two cavity ends. The cavity end walls are disposed across each respective cavity end adjacent one of the handle ends. The end wails strengthen the handle at the high-stress region where the handle joins the trim panel.

According to another aspect of the present invention the handle and trim panel may be integrally formed as a single piece unitary member.

According to another aspect of the present invention a panel aperture may be disposed in the trim panel between the handle ends and a panel plug disposed across the panel aperture and connected by well known means to a back surface of the panel to close the panel aperture.

According to another aspect of the present invention the handle may have a general U-shape and may arch outwardly from the panel to project into the passenger compartment and provide a space between the handle and the panel that an occupant can extend a hand through when grasping the handle.

According to another aspect of the present invention a method is provided for making a vehicle interior trim member. According to the method, a mold cavity is provided that is shaped to match exterior contours of the trim panel and handle. Molten material is provided in the mold cavity. A fluid is then provided in the molten material to form a cavity within the handle.

According to another aspect of the method of the present invention the panel portion of the mold and a handle portion of the mold are filled at the same time. In other words, the handle and trim panel are injected at the same time to form the handle and trim panel as a single unitary piece made up of the same material.

According to another aspect of the method of the present invention a fluid in the form of a gas, such as air, may be injected into the molten material in the handle portion of the mold cavity.

According to another aspect of the method of the present invention at least one gas injection nozzle may be provided and positioned so that it extends into and communicates with the handle portion of the mold cavity.

According to another aspect of the method of the present invention the mold cavity has at least two handle end portions shaped to match the exterior contours of the handle ends.

According to another aspect of the method of the present invention at least one molten material nozzle may be provided and positioned so that is extends into and communicates with the handle portion of the mold cavity.

According to another aspect of the method of the present invention molten material is provided in the panel portion of the mold prior to injecting the material into the handle portion of the mold.

BRIEF DESCRIPTION OF THE DRAWINGS

To better understand and appreciate the invention, refer to the following detailed description in connection with the accompanying drawings:

FIG. 1 is a perspective view of a vehicle trim member embodying an integral hollow assist handle of the present invention;

FIG. 2 is an enlarged cross-sectional view taken generally along line 2—2 of FIG. 1;

FIG. 3 is a fragmentary sectional view of a mold tool showing the process of manufacturing the trim components of FIG. 1 in accordance with the invention;

FIG. 4 is a perspective view of a vehicle trim member embodying an integral hollow assist handle and panel lug of the present invention with the panel plug removed for clarity;

FIG. 5 is an enlarged cross-sectional view taken generally along line 5—5 of FIG. 4 with the panel plug fastened in place; and FIG. 6 is a fragmentary sectional view of a second mold tool showing a process of manufacturing the trim components of FIG. 4 in accordance with the invention.

DETAILED DESCRIPTION

A vehicle interior trim member constructed according to a first embodiment of the present invention is gene sally shown at 10 in FIGS. 1 and 2. A vehicle interior trim member constructed according to a second embodiment of the present invention is generally shown at 10' in FIGS. 4 and 5. Reference numerals with the designation prime (') in FIGS. 4 and 5 indicate alternative configurations of elements that also appear in the first embodiment. Where a portion of the following description uses a reference numeral to refer to the figures, I intend that portion of the description to apply equally to elements designated by primed numerals in FIGS. 4 and 5 except where I indicate otherwise.

The vehicle interior trim member 10 comprises a trim panel that may be in the form of a generally elongated member as shown at 12 in FIG. 1. The trim panel 12 has a size and shape and suitable attachments for mounting the vehicle interior trim member 10 on a vehicle interior frame structure (not shown). The vehicle interior frame structure that the trim member 10 mounts to may, for example, be one of the generally vertical pillars disposed between vehicle door openings and windows or may be the overhead frame structure spanning such pillars. Trim panels of this type are designed to conceal the metal vehicle structure behind the panels and in some cases are designed to offer vehicle occupants a certain amount of impact protection in the event of a collision or sudden vehicle deceleration.

The vehicle interior trim member 10 also comprises a hollow body assist handle such as the one generally indicated at 14 in FIGS. 1 and 2. The handle 14 has a hollow elongated main handle body 16 that extends between two opposite handle ends 18. The handle ends 18 integrally extend from an outer surface 20 of the trim panel 12 as shown in FIGS. 1 and 2.

The handle 14 includes a generally tubular interior cavity, generally indicated at 22 in FIG. 2, that extends long and within the main body portion 16 of the handle 14 between two cavity ends 24, 26. The cavity 22 has a tubular main body wall 28 that extends between two cavity end walls and follows the contour of the main handle body 16. The cavity end walls, shown at 30 and 32 in FIG. 2, are disposed across each respective cavity end adjacent one of the handle ends 18. Each cavity end wall 30, 32 has an arcuate shape that blends into the generally tubular main body 16. The arcuate blended shape of the end walls 30, 32 is less prone to concentrating stresses than are angled corners and help reduce the risk of material failure in the handle 14.

The handle 14 and trim panel 12 comprise a single piece unitary member comprising a single material, preferably a polycarbonate-ABS blend. However, the mate rial may alternatively comprise any one of a number of plastics or resin compositions known in the art.

The end walls 30, 32 strengthen the handle 14 by strengthening the handle ends 18, i.e., adding material to the high-stress handle end regions 18 where the handle 14 attaches to the trim panel 12.

The handle 14 has a general U-shape and arches outwardly from the panel outer surface 20, projecting into the passenger compartment. The arch provides a space between the handle 14 and the panel outer surface 20 that a vehicle occupant can extend a hand through when grasping the handle 14.

A panel aperture, shown at 36 in FIGS. 4 and 5, may be disposed in the trim panel 12 between the handle ends 18. According to the second embodiment of FIGS. 4 and 5, a panel plug 38 may be disposed across the panel aperture 36. The panel plug 38 is connected by well-known means to a back surface 40' of the panel 12' to close the panel aperture 36 and present a finished appearance to vehicle occupants.

In other embodiments, the handle 14 may have any one of a number of suitable shapes other than the shape shown in the figures. A suitable shape is one that allow a vehicle occupant to grasp the handle 14 securely enough to support at least a portion of the occupant's weight and that accommodates the shape of the trim panel 12 that the handle 14 extends from.

In practice, a mold tool, generally shown at 40 in FIG. 3, is provided to form the trim panel member 10. The mold tool 40 includes a mold cavity, generally indicated at 42 in FIG. 3, that is shaped to complement the exterior contours of the trim panel 12 and handle 14. An alternative mold tool configuration is generally shown at 40" in FIG. 6. Reference numerals with the designation double prime (") in FIG. 6 indicate alternative configurations of elements that also appear in the FIG. 3 tool. Where a portion of the following description uses a reference numeral to refer to FIG. 3, I intend that portion of the description to apply equally to elements designated by double-primed numerals in FIG. 6 except where I indicate otherwise.

The FIG. 3 mold tool 40 is similar in construction to the FIG. 6 mold tool 42 except that mold tool 40 includes a separate inner arch portion 44. A molten plastic material is provided for forming the trim panel 12 and handle 14, preferably by injection molding techniques well known in the art. The molten plastic material is injected into both a trim panel portion 46 of the mold cavity 42 and a handle portion 48 of the mold cavity 42 either at the same time or within a relatively brief period of time. Typically, after the molten plastic material is partially injected into the handle portion 48 of the mold 40 a fluid 34 in the form of a pressurized gas, such as nitrogen, is injected into the molten material in the handle portion 48. The fluid 34 is injected through a gas injection nozzle 50 to form the handle cavity 22 within the handle 14. The gas injection nozzle 50 provides an opening for injecting gas into the molten handle material which displaces material which ordinarily would reside in the center of handle portion 48 of the mold cavity 42 allowing the displaced material to form the handle 14.

The mold cavity 42 has at least two handle end portions 52, 54 shaped to match the exterior contours of the handle ends 18. The gas nozzle 50 is preferably supported adjacent one of the handle end portions 52 of the mold cavity 42. A molten material nozzle 56 is supported adjacent the same handle e d portion 52 of the mold cavity 42. The gas nozzle 50 is supported in a position to extend into and communicate with the handle portion 48 of the mold cavity 42.

According to one variation on the above method, the panel portion 46 of the mold cavity 42 and the handle portion 48 of the mold cavity 42 may be filled in sequence with different molten materials. In other words, a molten handle material may be introduced into the handle portion 48 and a molten panel material introduced into the trim panel portion 46 of the mold cavity 42. This may be done in a single operation to form the handle 14 and trim panel 12 as a single unitary piece made up of two different materials.

In addition, the fluid 34 injected into the molten material in the handle portion 48 of the mold cavity 42 need not be nitrogen, but may be any suitable fluid. A suitable fluid is one that, when injected into the molten material displaces the molten material and forms a cavity within the handle 14. Where the fluid is a gas it is preferably inert. Moreover, the fluid 34 may be introduced into the molten material by means other than an injection nozzle. Also, the gas and molten material nozzles 50, 56 may be positioned and supported to introduce gas and molten material into the handle portion 48 of the mold cavity 42 other than as shown in the figures.

The present invention simplifies the manufacture of trim components having integral handles by combining their molding and assembly into a single operation.

The description and drawings illustratively set forth my presently preferred invention embodiments. I intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

I claim:

1. A vehicle interior trim member comprising:
   a trim panel configured to mount on a vehicle interior frame structure;
   a hollow handle having an elongated main handle body extending between two opposite handle ends, the handle ends integrally extending from an outer surface of the trim panel, the handle including a generally tubular interior cavity that extends along and within the main body portion between two cavity ends; and
   a cavity end wall disposed across each respective cavity end adjacent one of the handle ends to strengthen the handle.

2. A vehicle interior trim member as defined in claim 1 in which the handle and trim panel are integrally formed as a single piece unitary member.

3. A vehicle interior trim member as defined in claim 1 further comprising a panel aperture disposed in the trim panel between the handle ends and a panel plug disposed across the panel aperture and connected to a back surface of the panel.

4. A vehicle interior trim member as defined in claim 1 in which the handle has a general U-shape and arches outwardly from the outer surface of the panel.

5. A method for making a vehicle interior trim member, the interior trim member comprising a trim panel configured to mount on a vehicle interior frame structure, a hollow handle having an elongated main handle body extending between two opposite handle ends, the handle ends integrally extending from an outer surface of the trim panel, the handle including a generally tubular interior cavity that extends along and within the main body portion between two cavity ends, and a cavity end wall disposed across each respective cavity end adjacent one of the handle ends; the method including the steps of:
   providing a mold cavity having a trim panel portion shaped to form exterior contours of the trim panel and having a handle portion shaped to form exterior contours of the handle;
   providing material in the trim panel portion of the mold cavity;
   providing molten material in the handle portion of the mold cavity;
   providing a fluid in the molten material in the handle portion of the mold cavity to form a cavity within the handle;
   allowing the molten material to harden into an interior trim member having a trim panel portion and a hollow handle portion integrally extending from the trim panel portion; and
   removing the interior trim member from the mold cavity.

6. The method of claim 5 in which the step of providing material in the trim panel portion includes the step of providing molten material in the trim panel portion of the mold cavity.

7. The method of claim 5 in which the step of providing a fluid includes the step of injecting a gas into the molten material in the handle portion of the mold cavity following the step of providing the molten material at least partially in the handle portion of the mold cavity.

8. The method of claim 6 in which the step of providing a fluid includes the step of providing at least one gas injection nozzle that extends into the handle portion of the mold cavity.

9. The method of claim 5 in which the step of providing material in the panel portion of the mold is performed at the same general time as the step of providing molten material in the handle portion of the mold.

10. The method of claim 5 in which the step of providing material in the panel portion of the mold is performed after the step of providing molten material in the handle portion of the mold.

11. The method of claim 6 in which the step of providing a mold cavity includes the step of providing a mold cavity having at least two handle end portions shaped to form exterior contours of the handle ends;
   and in which the step of providing a fluid includes the step of providing at least one gas injection nozzle at one of the handle ends, the nozzle extending into and communicating with one of the handle end portions of the mold cavity.

* * * * *